3,539,460
Patented Nov. 10, 1970

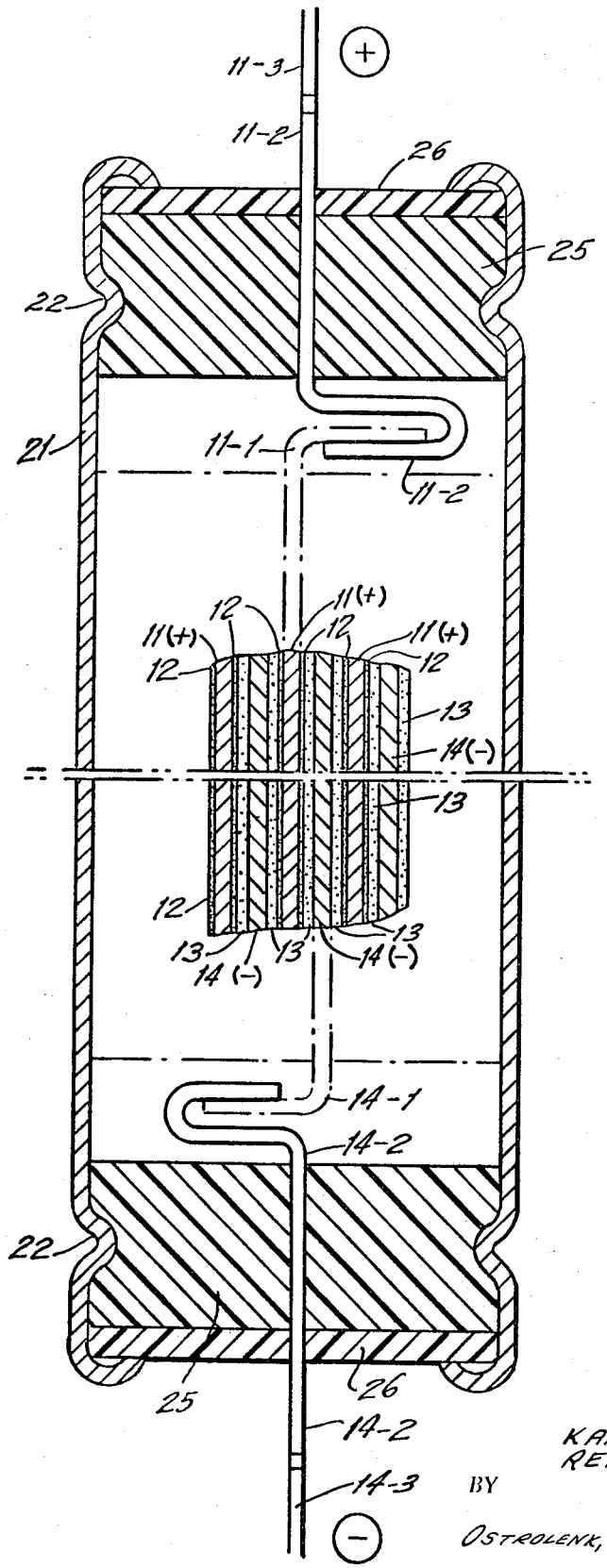

3,539,460
TANTALUM CAPACITORS AND TANTALUM HAVING EXTERIOR DIELECTRIC OXIDE FILM TANTALUM CAPACITORS
Karl Sedlatschek, Kirchweg 20, Reutte, Tirol, Austria, and Reginald Leuprecht, Hofen, near Reutte, Tirol 93, Austria
Original application Mar. 16, 1966, Ser. No. 534,718. Divided and this application June 3, 1968, Ser. No. 740,423
Claims priority, application Austria, Mar. 19, 1965, A 2,545/65
Int. Cl. C23f 17/00; C23b 9/00
U.S. Cl. 204—56                    9 Claims

ABSTRACT OF THE DISCLOSURE

The leakage resistance of a tantalum capacitor is materially increased by subjecting the tantalum foil surface to an initial purification by treating the surface in an aqueous alkaline solution having dissolved therein an oxidizing compound followed by the anodizing of the so treated tantalum surface. The purification treatment may be combined with passage of electrolytic current through the purified foil. Good results are obtained with aqueous alkaline solutions of hydroxides of potassium, sodium or lithium. The oxidation compound may consist of potassium permanganate or ammoniumpersulfate and analogous compounds.

---

This is a division of application Ser. No. 534,718 filed Mar. 16, 1966, now abandoned.

This invention relates to tantalum electrolytic capacitors and more particularly to the tantalum anode thereof having formed on its exposed surface a tantalum oxide dielectric stratum that is in contact with the electrolyte which constitutes the cooperating negative capacitor electrode. Such tantalum capacitors have found wide acceptance because of their high capacitance per unit volume (volume efficiency), long shelf life, great stability and their good electrical characteristics when exposed to very low and high temperatures. Such tantalum electrode may consist of a foil or wire with a plane or etched surface, or of a porous sintered tantalum-powdered body. The dielectric tantalum oxide stratum is formed on the exposed tantalum surfaces of the foil, wire or exterior and pore surfaces of the sintered porous electrode body by the known electrolyte formation treatment, or anodic oxidation.

In addiiton to the other important operating characteristics the leakage resistance is a factor of great importance in determining the quality of an electrolytic capacitor.

Among the objects of the invention is a tantalum electrolytic capacitor having a leakage resistance of a greater order of magnitude than that of the best prior tantalum electrolytic capacitors of otherwise similar characteristics.

The invention is based on the discovery that such large increase of leakage resistance of tantalum electrolytic capacitors is achieved by subjecting the tantalum electrode metal to an initial treatment, which removes therefrom, and particularly from the exposed tantalum surfaces, impurities including the extremely thin previously formed oxide strata and thereafter subjecting the so treated tantalum to anodic oxidation which forms thereon the desired continuous minutely thin tantalum oxide dielectric stratum or strata.

In accordance with the invention, such large leakage resistance increase is secured by initially treating the tantalum electrode metal with an aqueous alkaline etching solution containing an oxidizing addition either in a cold state or at raised temperature, and either in absence of electrolytic current or with an electrochemical action wherein the tantalum may constitute the anode. The so treated tantalum electrode metal is then subjected to the known anodic oxidation treatment wherein the desired continuous minutely thin tantalum oxide dielectric stratum is formed on the entire so treated surface of the tantalum electrode.

The foregoing and other objects of the invention will be best understood from the following description of an exemplification thereof, reference being had to the accompanying drawing wherein:

FIG. 1 is a cross-sectional and partially diagrammatical view of an example of a known form of tantalum electrolytical capacitor made in accordance with and embodying the instant invention, with some dimensions being exaggerated, for sake of clarity.

For sake of brevity, this specification relies on known publications and patents describing the various known forms of known tantalum capacitors, including the Sprague Technical Paper No. 60–4, entitled "Symposium on Tantalum Capacitors," Copyright 1960 by the Sprague Electric Co. This Sprague Technical Paper describes tantalum-foil electrolytic capacitors, liquid-electrolyte sintered-anode tantalum capacitors and solid-electrolyte sintered-anode tantalum capacitors. It also describes their principal operating characteristics including their direct-current (D-C) leakage current characteristics and the ratio of D-C leakage current at rated voltage for different temperature from 25 to 150° C. Its FIG. 8 shows that the D-C leakage current increases materially as the operating temperature of such capacitors is increased. Its FIG. 15 shows that as the operating temperature of such tantalum electrolytic capacitors is increased, their failure rate increases. Accordingly, there has long existed urgent need to decrease the leakage current or to increase the leakage resistance of such tantalum electrolytic capacitors and thereby materially decrease their failure rate which is materially increased by internal heating due to the D-C leakage current.

According to the invention, the leakage current of known tantalum electrolytic capacitors is materially decreased by subjecting the surface of the tantalum anode body, before giving it the known anodizing formation treatment, to a pre-formation initial purification treatment which removes from such tantalum electrode body its surface impurities including the oxide strata previously formed thereon. Good results are obtained by initially pretreating such tantalum electrode body with an aqueous alkali solution containing an oxide addition. This initial preformation treatment of the anode tantalum body may be effected either in a cold state or normal temperatures or at elevated temperatures, without any electric current passage or with an electrochemical action. After removing the surface impurities from such tantalum anode body, it is subjected to the known conventional anodic formation treatment wherein the desired thin continuous tantalum oxide dielectric layer is formed on the surface of the tantalum anode electrode body.

FIG. 1 shows partially diagrammatically and with exaggerated dimension a known form of a polar tantalum electrolytic capacitor of the type described, for example, in connection with FIG. 1 of the above referred to Sprague Technical Paper, the tantalum anode of which has been treated to cause its tantalum oxide dielectric layer to have the greatly increased resistance to D-C leakage current, in accordance with the present invention. The capacitor comprises a tantalum foil anode 11 separated by a porous electrolyte holding separator sheet 13 from a facing tantalum foil cathode 14 of the same dimensions as the anode foil 11. The extended surfaces of the tantalum foil 11 have been subjected to a conventional anodizing formation treatment which forms on the entire exposed opposite surfaces and edges of the anode foil 11 a minutely thin tantalum oxide dielectric stratum 12. The liquid electrolyte fills all pores of the separator 13 and engages all facing surfaces of the tantalum oxide dielectric layer 12 and constitutes part of the capacitor cathode 14. The superposed anode foil 11 and cathode foil 14 with their interposed electrolyte holding separator 13 have been spirally wound into a conventional coiled electrode assembly which is enclosed within a cubular metallic casing 21. The opposite open casing ends are sealed by a suitable electrically insulating alkali-resistant strong sealing blocks or bodies, for example, of polytetrafluoroethylene and chlorotrifluoroethylene. Thus in the example of FIG. 1, each inner strong sealing body block 25 may be formed of polytetrafluoroethylene combined on its exterior side by an adjoining sealing body block section 26 of chlorotrifluoroethylene. Each tubular end region of the metallic casing has been subjected to an inward deformation spinning which forms an inward ridge 22 forced into the surrounded insulating seal block 25 and is interlocked therewith.

The anode tantalum foil 11 is provided in a conventional way with a connector tab extension 11–1 to which is joined, as by welding, a tantalum terminal wire 11–2 which is sealed with a tight sealing junction through the upper composite sealing blocks 25, 26. The cathode foil 14 is provided with a similar conventional connector tab 14–1 to which is welded the inner end of an opposite polarity terminal wire 14–2, which is sealed with a tight seal through the similar opposite insulating sealing blocks 25, 26. To the outer ends of the opposite tantalum terminal wires 11–2, 14–2 are affixed, as by electric buttwelds, tinned nickel lead terminal wires 11–3 and 14–3, respectively.

The porous separator 13 is of conventional form and may consist of any of the known porous filter sheets of a suitable alkali-resistant material such as known alkali filter paper or filter sheets formed of matted tangled fiber length of polypropylene or other strong alkali-resistant synthetic fibers, for example, of nylon, polyester or acrylic resin and the like. If such fibers, which are not readily wetted by the conventional capacitor electrolyte, and addition of a wetting agent may be admixed to the resins out of which the fibers of such porous filter sheets are formed.

The coiled capacitor electrode assembly is usually filled with the capacitor electrolyte before being inserted and sealed in the casing 21. The metal casing 21 may be formed of the metals which are conventionally used in such capacitors. If formed of steel and connected to the associated circuit, its entire interior surface may be coated in a conventional way with an adherent continuous insulating coating formed, for example, of polytetrafluoroethylene, or another electrolyte resistant resin. This assures that the metallic casing 21 is insulated from all conducting elements of the enclosed capacitor assembly.

In accordance with the invention, the leakage resistance of the tantalum oxide dielectric layer 12 of the tantalum anode 11 is increased to several times the resistance of that heretofore achieved or achievable with the best tantalum electrolytic capacitors. To this end, before subjecting it to the anodizing formation treatment which forms thereon the thus continuous dielectric tantalum oxide layer 12, the tantalum anode foil 11 is first subjected to initial pre-formation or purification treatment in an aqueous alkali solution which contains dissolved therein an oxidizing compound addition. This pre-formation treatment of the invention is carried on either in a cold state, or normal temperatures, or at raised temperatures and either in the absence of an electric current or electrochemically with the metallic tantalum being the anode. Such pre-formation treatment is continued until all impurities are removed from the metallic surface of the tantalum anode 11, including the complete removal of any previously formed minutely thin oxide-strata portions present thereon. After completion of such pre-formation or purification treatment, the metallic tantalum foil anode 11 is subjected to the conventional anodic formation treatment in which the entire metallic surface and the edges of the tantalum anode 11 and its terminal leads 11–2 has formed thereon the desired continuous minutely thin tantalum oxide dielectric layer 12.

Further features of the invention will be understood from the following description of examples thereof:

EXAMPLE 1

A capacitor of the type described in connection with FIG. 1 was formed with a smooth tantalum anode foil $7.5\mu$ (microns) thick and surface edges 5.10 cm. (centimeter) long or an area of approximately 1 dm.$^2$ (decimeter square). The anode foil 11 was subjected to a known anodic formation treatment in a diluted solution of phosphoric acid at 85° C. with a current of 155 ma. (milliamperes) until a formation voltage of 200 volts was reached after 60 minutes. Thereafter the so treated tantalum anode foil 11 with the dielectric oxide strata 12 formed thereon was subjected to a follow-up treatment for 3 minutes with a measuring direct-current voltage of 150 volts. Under such applied measuring voltage, the leakage current was 10 $\mu$a./dm.$^2$ (microampere per decimeter square). Another alike anode tantalum foil was first subjected for 5 minutes to a pre-formation purification treatment of the invention in a hot aqueous solution containing in each 70 g. (grams) water dissolved therein, 30 g. potassium hydroxide and 10 g. potassium permanganate as an oxidizing compound medium. The so pretreated anode foil was thereafter subjected to the same anodizing formation treatment in the same diluted solution of phosphoric acid at 85° C. with a formation current of 155 ma. for 60 minutes until the formed tantalum oxide dielectric layer 12 raised the formation voltage to 200 volts. After a similar 3-minute follow-up treatment at room temperature with a measuring direct-current voltage of 150 volts, the measured leakage current passing through the tantalum oxide dielectric layer of the anode foil, which was only 0.325 $\mu$a./dm.$^2$.

EXAMPLE 2

A similar large decrease in the leakage current through the dielectric layer of the tantalum anode of the invention of Example 1 was also exhibited when such tantalum anode was assembled in a capacitor such as shown in FIG. 1, compared with a similar capacitor having an otherwise alike tantalum anode which was not subjected to the pre-formation treatment of the invention.

EXAMPLE 3

The same size tantalum anode foil was first subjected to 2 minutes of a pre-formation treatment of the invention in a hot solution containing 10 g. ammonium sulfate as an oxidizing agent, 30 g. of potassium hydroxide per 60 g. water. At a measuring direct current voltage of 150 volts, the leakage current of the tantalum oxide dielectric stratum formed on the anode foil subjected to this pre-formation treatment was reduced to 1.24 ma./dm.$^2$ compared to leakage current of 10.5$\mu$/dm.$^2$ for a similarly formed dielectric tantalum oxide layer of an otherwise alike anode foil which was not subjected to the pre-formation treatment of the invention.

EXAMPLE 4

A similar decrease in the leakage current and corresponding increase in the leakage resistance was exhibited by capacitors of the type described in connection with FIG. 1 formed with an anode which was subjected to the pre-formation treatment of the invention described in Example 3 in comparison with a similar capacitor in which an otherwise alike tantalum anode foil was not subjected to the just described pre-formation treatment.

EXAMPLE 5

The same size tantalum anode foil was first subjected to a pre-formation treatment in a solution containing 10 g. potassium hydroxide and 10 g. potassium permanganate per 70 cm.$^3$ (cubic centimeter) water as oxidizing compound while subjected to current with a current density of 700 ma./dm.$^2$ (milliampere per decimeter square). After forming on the so pre-treated tantalum anode foil a continuous tantalum oxide dielectric layer by the formation treatment of Example 1, its leakage resistance was measured as in Example 1 with 150 volts direct current. Whereas the leakage current through the tantalum oxide stratum of the so pre-treated tantalum anode foil under an applied 150 volts direct current was only 0.385 ma./dm.$^2$—the leakage current for similar tantalum anode foil which was not subjected to the pre-formation treatment of the invention was 10.8 ma./dm.$^2$ under the same measuring voltage. The equivalent of a back-to-back or non-polar electrolytic tantalum capacitor is obtained by serially connecting—but with reversed polarity—two polar tantalum capacitors, for example, such as described above in connection with FIG. 1.

In accordance with the invention, the desirable large reduction in the leakage current and corresponding increase in the leakage resistance of the tantalum anode foil is also achieved with a treatment of the invention described above applied to a much thicker tantalum foil before reducing it to the thin tantalum foil dimension on which the tantalum oxide dielectric stratum is formed by a process such as described above in Example 1. As an example, a tantalum foil 15µ thick was subjected to a pre-formation treatment as described above for removing therefrom impurities including tantalum oxide formations. After completing the pre-formation treatment on the 15µ thick tantalum foil, its thickness was reduced in a conventional way to a thickness of 7 to 8µ when used in capacitors having smooth anode foil surfaces or to a thickness of 11 to 15µ when used in capacitors having etched or rough anode foil surfaces. Tantalum capacitor foil anodes made with and embodying the treatment of the invention described above have not only the advantage in securing the desired large reduction of the leakage current but also the further advantage that the continuous dielectric tantalum oxide layer may be built up thereon until a higher formation voltage is reached than possible with a similar tantalum anode foil which was not subjected to the pre-formation treatment of the invention.

Furthermore, part of the leakage current contributed by the required welded junction between the tantalum anode foil and tantalum terminal lead is likewise greatly decreased by subjecting this welded terminal wire junction simultaneously with its tantalum anode foil to such above described formation treatment followed by the tantalum oxide dielectric-stratum formation treatment as described in connection with Example 1.

The above described features of the invention are also of great value when applied to sintered-anode tantalum capacitors, such as described in pages 1, 2, 7 to 12 and 25 to 35 of the aforesaid Sprague Technical Paper. As an example, the porous sintered tantalum anode with the tantalum terminal wire welded thereto, for instance as shown and described in connection with FIG. 1 of the Sprague Technical Paper, is first given a pre-formation treatment of the invention, such as described above in connection with Examples 1, 2 and 3. Thereafter, such pre-treated sintered tantalum anode with its lead wire is subjected to the anodizing formation treatment which forms on all pore surfaces and on the exterior of the sintered tantalum anode the thin continuous and adhering tantalum oxide dielectric stratum which exhibits a much higher leakage resistance than a similar prior sintered tantalum anode which was not subjected to the pre-formation treatment of the invention.

In addition, the invention will also secure great decrease of the leakage current when embodied or applied to non-polar or back-to-back tantalum electrolytic capacitors having two adjacent opposite polarity tantalum electrodes and a separator space filled with electrolyte, in which case each tantalum electrode is first subjected to an impurity-removing pre-formation treatment, followed by the anodizing-formation treatment which produces on all its surfaces a continuous tantalum oxide layer having the desired high leakage resistance.

Tantalum anodes for electrolytic capacitors which have been subjected to the pre-formation treatment of the invention thereby greatly increasing the leakage resistance of their tantalum-oxide dielectric stratum may be produced with aqueous alkaline solutions having dissolved therein other etching compounds and other oxidation compounds than those described in the examples hereof. For instance, the potassium hydroxide may be replaced by another alkali metal hydroxide, such as sodium hydroxide, lithium hydroxide or other analogous alkali etching compounds. Similarly, the potassium permanganate or ammonium persulfate oxidation additions may be replaced with analogous oxidation compounds, such as chlorate, perchlorate, perborate oxidation compounds.

The exemplifications of the invention described above will suggest other modifications and applications thereof and the claims shall not be limited thereto.

What is claimed is:

1. In the process of producing from a tantalum body a tantalum anode of an electrolytic capacitor having formed on the surfaces of said tantalum anode a continuous tantalum-oxide dielectric stratum adhering to underlying tantalum metal and exposed to contact engagement with the capacitor electrolyte, the procedure comprising subjecting said tantalum body to an electrolytic anodizing treatment within an an aqueous solution containing dissolved therein an alkali etching compound and an oxidation compound and causing removal of said tantalum body impurities including tantalum-oxide formations and thereby causing greater increase of the leakage resistance of the continuous tantalum-oxide dielectric stratum subsequently formed on said tantalum body, and thereafter subjecting the so initially treated tantalum body to an electrolytic anodizing treatment wihin an anodizing electrolyte causing conversion of tantalum of said body into a continuous tantalum-oxide dielectric stratum exposed to said anodizing electrolyte.

2. In the process of producing a tantalum anode of an electrolyte capacitor from a tantalum body as claimed in claim 4, the aqueous solution of said initial purifying treatment consisting of water containing dissolved therein an alkaline etching compound selected from the group consisting of potassium hydroxide, sodium hydroxide and lithium hydroxide with said aqueous solution also containing dissolved therein an addition of an oxidizing substance selected from the group consisting of potassium permanganate and ammonium persulfate.

3. In the process of producing a tantalum anode of an electrolytic capacitor from a tantalum body as claimed in claim 4, said initial purifying treatment including passage of electrolytic current through said aqueous solution constituting the electrolyte and through said tantalum body with said tantalum body being the anode exposed to said electrolyte.

4. In the process of producing a tantalum anode of an electrolyte capacitor from a tantalum body as claimed in claim 4, the aqueous solution of said initial purifying treatment consisting of water containing dissolved therein an alkaline etching substance selected from the group consisting of potassium hydroxide, sodium hydroxide and lithium hydroxide
with said aqueous solution also containing dissolved therein an addition of an oxidizing substance of either potassium permanganate or ammonium persulfate,
said initial purifying treatment including passage of electrolytic current through said aqueous solution constituting the electrolyte and through said tantalum body with said tantalum body being the anode exposed to said electrolyte.

5. In the process of producing from a tantalum body a thin tantalum anode foil of an electrolytic capacitor having formed on the surface of said tantalum anode foil a continuous tantalum-oxide dielectric stratum adhering to underlying tantalum metal and exposed to contact engagement with the capacitor electrolyte,
the procedure comprising,
subjecting a relatively thick tantalum foil, considerably thicker than the desired anode foil thickness, to an initial purifying treatment by etching the surface of said thick body within an aqueous alkaline solution having dissolved therein alkali hydroxides and an oxidizing compound,
thereafter reducing the thickness of the so purified tantalum body to the smaller thickness of the desired thin anode foil,
and thereafter subjecting the surface of the so obtained thin tantalum anode foil to an electrolytic-anodizing and tantalum-oxide-stratum forming treatment.

6. In the process of producing a thin anode foil as claimed in claim 5,
said purifying treatment comprising immersing said thick tantalum body within an etching solution of an aqueous alkaline solution containing dissolved therein at least one of the hydroxides of potassium, sodium and lithium, and of an oxidizing compound.

7. In the process of producing from a tantalum body a thin tantalum anode foil of an electrolytic capacitor having formed on the surface of said tantalum anode foil a continuos tantalum-oxide dielectric stratum adhering to underlying tantalum metal and exposed to contact engagement with the capacitor electrolyte, as claimed in claim 5,
said purifying treatment comprising immersing said thick tantalum body within an etching solution of an aqueous alkaline solution containing dissolved therein at least one of the hydroxides of potassium, sodium and lithium, and of an oxidizing compound of potassium permanganate or ammonium persulfate.

8. In the process of producing a thin anode foil as claimed in claim 6,
said purifying treatment comprising immersing said thick tantalum body within an etching solution of an aqueous alkaline solution containing disolved therein at least one of the hydroxides of potassium, sodium and lithium, and of an oxidizing compound, and
passing electric curent through said aqueous solution and said tantalum body held immersed therein to anodize said tantalum body.

9. In the process of producing from a tantalum body a thin tantalum anode foil of an electrolytic capacitor having formed on the surface of said tantalum anode foil a continuous tantalum oxide dielectric stratum adhering to underlying tantalum metal and exposed to contact engagement with the capacitor electrolyte, as claimed in claim 5,
said purifying treatment comprising immersing said thick tantalum body within an etching solution of an aqueous alkaline solution containing dissolved therein at least one of the hydroxides of potassium, sodium and lithium, and of an oxidizing compound of potassium permanganate or ammonium persulfate, and
passing electric curent through said aqueous solution and said tantalum body held immersed therein to anodize said tantalum body.

References Cited

UNITED STATES PATENTS

| | | | |
|---|---|---|---|
| 3,332,859 | 7/1967 | Dunn et al. | 204—32 |
| 3,378,471 | 4/1968 | Vermilyea | 204—56 |

JOHN H. MACK, Primary Examiner

R. L. ANDREWS, Assistant Examiner

U.S. Cl. X.R.

204—141